United States Patent
Buchanan

(10) Patent No.: US 6,648,207 B2
(45) Date of Patent: Nov. 18, 2003

(54) METHOD FOR APPLYING SELF-FLUXING COATINGS TO NON-CYLINDRICAL FERRITIC OBJECTS

(75) Inventor: Edward R. Buchanan, Short Hills, NJ (US)

(73) Assignee: Cincinnati Thermal Spray, Inc., Cincinnati, OH (US)

( * ) Notice: Subject to any disclaimer, the term of this patent is extended or adjusted under 35 U.S.C. 154(b) by 10 days.

(21) Appl. No.: 10/054,018

(22) Filed: Jan. 22, 2002

(65) Prior Publication Data

US 2002/0100796 A1 Aug. 1, 2002

Related U.S. Application Data

(60) Provisional application No. 60/265,014, filed on Jan. 30, 2001.

(51) Int. Cl.[7] ............ B23K 31/02; B05D 1/36; C23C 4/08
(52) U.S. Cl. .......... 228/122.1; 228/124.1; 228/158; 427/419.4; 427/455
(58) Field of Search ............ 427/376.2, 419.2, 427/427, 431, 443.2, 419.4, 419.7, 419.6, 376.4, 376.5, 453, 454, 455, 456, 450, 446, 532, 376.8, 405, 383.7, 422; 228/122.1, 124.1, 199, 200, 158

(56) References Cited

U.S. PATENT DOCUMENTS

| | | | |
|---|---|---|---|
| 3,607,343 A | * | 9/1971 | Longo |
| 3,655,425 A | | 4/1972 | Longo et al. |
| 3,819,384 A | | 6/1974 | Ingham, Jr. et al. |
| 3,829,260 A | | 8/1974 | Shimoda |
| 3,837,817 A | | 9/1974 | Nakamura |
| 3,977,660 A | | 8/1976 | Nakahira |
| 4,075,392 A | | 2/1978 | Jaeger |
| 4,401,724 A | | 8/1983 | Moskowitz et al. |
| 4,471,034 A | | 9/1984 | Romero et al. |
| 4,507,151 A | | 3/1985 | Simm et al. |
| 5,375,759 A | | 12/1994 | Hiraishi et al. |
| 6,129,994 A | * | 10/2000 | Harada et al. |
| 6,326,063 B1 | * | 12/2001 | Harada et al. |

FOREIGN PATENT DOCUMENTS

| | | | |
|---|---|---|---|
| EP | 0185430 A1 | * | 6/1986 |
| EP | 0 443 794 A1 | | 8/1991 |
| JP | 360089504 A | * | 5/1985 |
| JP | 411217664 A | * | 8/1999 |

OTHER PUBLICATIONS

US 2002/0100796A1 Buchanan (Aug. 1, 2002).*

* cited by examiner

*Primary Examiner*—Kiley Stoner
(74) *Attorney, Agent, or Firm*—Frost Brown Todd LLC

(57) ABSTRACT

This disclosure describes a technique for fusing self-fluxing metallic coatings on non-cylindrical objects without the need to conduct the fuse operation in a vacuum furnace or some other type of protective environment. The technique consists of first applying the self-fluxing coating to the surface, then optionally applying a ceramic coating on top of the self-fluxing coating. The object is then submerged into a vessel containing a low-melting inert material. The aggregate is then heated, and as the glass becomes molten, it encases the object and protects it from oxidation. As heating continues, the fusing temperature is reached and the self-fluxing alloy becomes molten. The ceramic coating encases the self-fluxing alloy and acts as a mold. When fusing is complete, the aggregate is then slowly cooled to ambient temperature. The glass frit and the ceramic shell are then removed, and one is left with an object coated with a uniform thickness of a dense adherent fused coating on the surface of the object.

13 Claims, No Drawings

US 6,648,207 B2

METHOD FOR APPLYING SELF-FLUXING COATINGS TO NON-CYLINDRICAL FERRITIC OBJECTS

CROSS-REFERENCE TO RELATED APPLICATION

This application is based on and claims priority from U.S. Provisional Application No. 60/265,014, filed Jan. 30, 2001.

TECHNICAL FIELD

The present application relates to a method for applying a dense, uniform fused metal coating on metal objects.

BACKGROUND OF THE INVENTION

Many metallic articles are protected from wear and/or corrosion by applying a hard metal coating to their exterior surface. An example of such articles include pump sleeves, valve seats, pump impellers, and turbine blades.

One class of coating which receives widespread use in industry is the so-called "self-fluxing" coating. These coatings are generally nickel-based or cobalt-based alloys to which silicon and boron have been added to reduce their melting point to about 2000° F. The most widely used of these coatings is perhaps AMS 4775A, which nominally contains 15% chromium, 3% boron, 3% silicon, and 1% carbon, with the balance of the alloy being essentially nickel.

In the simplest form of its application, this coating is sprayed onto the periphery of a rapidly rotating cylindrical stainless steel object, such as a pump sleeve. The coating is then fused or melted by hand with a torch to densify the coating and bond it to the underlying base alloy. It is possible to do this because the melting point of the base alloy is usually about 2700° F., while the melting point of the self-fluxing alloy is about 2000° F. If the sleeve is heated to just above 2000° F., the coating will melt, densify, and bond to the base metal without damage to the base metal structure. The coated object may then be ground to final dimensions.

There are many objects whose performance would be enhanced if this coating could be applied to their surface, but which are not coated because it is either too difficult or too expensive to do so. An example of such an object would be a cylindrical ball valve or a rotor for a screw pump. The coating can be easily sprayed onto the surfaces to be protected, but it is difficult or impossible to torch-fuse the sprayed part successfully because of its irregular shape. Edges and corners of the object being fused will radiate heat outward and cool quickly, causing the coating to contract and pull back from these areas after fusing. Cracking may also occur in these areas due to the thermal gradients which exist during processing.

Heretofore, the only way a self-fluxing coating could be applied to a component with a non-cylindrical shape has been to fuse it in either a vacuum furnace or a furnace with a protective atmosphere. In this manner, the entire component reaches the fuse temperature at the same time, and thermal gradients are eliminated. The protective environment is necessary because the constituents in the coating oxidize extensively in air. However, protective atmosphere heat treatment is a much more expensive process than hand-fusing with a torch, particularly when product quantities are small or the parts are large.

The present invention, therefore, defines a process, which is both easy and inexpensive, for providing a fused self-fluxing metal coating on a metal article. This process provides a strong durable coating without resulting in oxidation, thermal gradients or cracking of the underlying part.

Coating metal articles utilizing self-fluxing alloys is well-known in the art, although the process of the present invention has not heretofore been disclosed or suggested.

U.S. Pat. No. 4,075,392, Jaeger, issued Feb. 21, 1978, describes alloy-coated ferrous materials which are said to exhibit a resistance to heat and corrosion combined with thermal conductivity. The coating includes self-fluxing alloys together with a strong carbide- or boride-forming solute metal (such as tungsten, molybdenum or chromium), plus carbon, boron and silicon. The coating is applied by flame-spraying the alloy powder onto the surface to be coated (see column 5, line 6-column 6, line 20).

U.S. Pat. No. 3,819,384, Ingham, Jr., et al., issued Jun. 25, 1974, describes a powder adapted to be applied to a metal surface by flame spraying. The powder comprises a nickel or cobalt-based self-fluxing alloy powder together with a ferro-molybdenum alloy. The material is said to provide an adherent porous coating. The only disclosed method of application is flame spraying (in fact, the powder is said to be specifically adapted for that method of application).

U.S. Pat. No. 4,507,151, Simm, et al., issued Mar. 26, 1985, describes a powder composition used for thermal coating of work pieces. The compositions comprise a nickel, iron or cobalt-based self-fluxing alloy, together with fused tungsten carbide alloy particles. The materials are applied by flame-spray and thereafter fused to the metal surface. The coatings are said to provide a strongly bonded coating with a high resistance to abrasion and impact, with uniform properties across the cross-section of the coating.

U.S. Pat. No. 3,829,260, Shimoda, issued Aug. 13, 1974, describes a wear-resistant metal object useful, for example, as an apex seal on a rotary engine. The article is formed by spraying fine particles of a nickel-chromium-based self-fluxing alloy on the article and fusing the coating to the base metal. The coating may then optionally be subjected to a soft-nitriding process in which the coated article is immersed in molten potassium cyanate.

U.S. Pat. No. 4,471,034, Romero, et al., issued Sep. 11, 1984, describes a weld-bonded nickel-based alloy coating on a cast iron substrate. A plasma-transferred arc process is used to apply the coating wherein a puddle of the liquid alloy is maintained between the plasma arc and the iron substrate while the process is going on. The process is used to prepare molds for making molten glass objects.

U.S. Pat. No. 3,857,817, Nakamura, issued Sep. 24, 1974, describes a coating for piston rings comprising molybdenum, a self-fluxing alloy, and a metal carbide or metal oxide. The coating is applied by plasma spray and is said to provide excellent scuff and abrasion resistance.

U.S. Pat. No. 3,977,660, Nakahira, issued Aug. 31, 1976, describes a blast furnace tuyere which is said to have excellent thermal shock resistance. In this product, the substrate is a copper or copper alloy material. A nickel or cobalt-based self-fluxing alloy is plasma sprayed onto the substrate. A cement layer and a ceramic layer are then sequentially sprayed onto the object. A plasma jet-spray process is used to apply these materials to the substrate.

U.S. Pat. No. 4,401,724, Moskowitz, et al., issued Aug. 30, 1983, describes a boron-containing nickel or cobalt spray-and-fuse self-fluxing alloy powder which contains hard precipitates of chromium boride or chromium carbide, internally precipitated in the composition.

U.S. Pat. No. 5,375,759, Hiraishi, et al., issued Dec. 27, 1994, describes a method for applying a self-fluxing alloy coating to a ferrous metal surface. In this process, the surface is cleaned, a retaining wall is formed around the surface to be coated, and self-fluxing alloy powder is applied to a predetermined thickness. The powder layer is heated under non-oxidizing conditions and then cooled, also under non-oxidizing conditions.

SUMMARY OF THE INVENTION

The present invention relates to a method for fusing a coating to a metal surface, comprising the steps of:

(a) applying the coating (for example, a self-fluxing alloy) to said surface;

(b) submerging the coated surface into low-melting inert material (for example, glass frit);

(c) heating the low-melting inert material to a temperature at or about its fusing temperature so as to form an outer layer of the material on said surface;

(d) heating the coated surface to just below the solidus temperature of the coating;

(e) heating the coated surface to a temperature between the solidus and liquidus temperatures of the coating;

(f) cooling the coated surface to ambient temperature; and (g) removing the outer coating of fused inert material from the fused coated surface.

In a preferred embodiment, a ceramic coating, such as aluminum oxide, is placed on the surface of the article after the article is coated with the self-fluxing alloy (step (a)) and before the article is submerged into the low-melting inert material (step (b)).

DETAILED DESCRIPTION OF THE INVENTION

In the present invention, metal parts, and particularly non-cylindrical or irregularly-shaped parts, are provided with a fused metal coating by first applying the coating onto the object. The coating which is applied may be any fusing metallic coating which is applied typically to metal objects, however, self-fluxing alloy coatings are preferred. Self-fluxing alloy coatings are well-known in the art. These generally are nickel-based or cobalt-based alloys to which silicon and boron have been added to reduce their melting point to about 2000° F. The most widely used of these is perhaps AMS 4775A, which nominally contains 15% chromium, 3% boron, 3% silicon and 1% carbon, with the balance of the alloy being essentially nickel. Another such coating is tungsten carbide, such as that commercially available under the tradename CONFORMACLAD. Such carbide coatings, including tungsten carbide, titanium carbide, chromium carbide and tantalum carbide, may also be used in admixture with self-fluxing alloys. Examples of self-fluxing coatings are taught in U.S. Pat. Nos. 4,075,392; 3,819,384; 4,507,151; 3,829,260; 3,857,817; 3,977,660; 4,401,724; and 5,375,759; all of which are incorporated herein by reference. The coating may be applied to the metal part using any means known in the art (for example plasma spray, wire spray, paste or cloth), although thermal spray processes are preferred.

The coated part is then placed in a vessel, such as a steel tub, which is filled with a low-melting inert material having a vaporization point higher than the melting point of the self-fluxing alloy coating. The melting point of the inert material is typically from about 900 to about 1500° F. A preferred material is powdered glass (glass frit). The vessel is then heated to the fusing temperature of the glass frit (for example, about 1200° F.), by any means known in the art. Examples of such heating means include a torch or a non-protective furnace. Typically, this heating is to a temperature of from about 1000 to about 1400° F., for a period of from about 2 to about 4 hours. In this heating step, the glass becomes molten, serving two purposes: (1) the part being fused is maintained in a constant temperature environment, thus eliminating thermal gradients, and, more importantly, (2) the liquid glass envelops the part being fused and protects it from oxidation. In addition, the glass layer exerts a hydrostatic force which minimizes slump of the self-fluxing coating.

The coated surface (the aggregate) is then heated to just below (i.e., about 10° F. to about 40° F., preferably about 25° F., below) the solidus temperature of the self-fluxing alloy (for example, about 1660° F.—about 1690° F. where the self-fluxing alloy is AMS 4775A), and held there for several hours to equalize the temperature throughout the system. The aggregate is then heated to a temperature between the solidus and liquidus temperature of the self-fluxing alloy (for example, about 1810° F. where the self-fluxing alloy is AMS 4775A). After holding the vessel at this final temperature for an appropriate length of time to ensure that the self-fluxing coating has reached the final temperature (for example, from about 1 to about 6 hours), the article is then cooled slowly to ambient temperature. This cooling takes place typically at a rate of about 200° F./hour, although that is not critical. The glass is then broken away from the object, and the fused coated object is removed for further processing, such as machining or grinding. The object has a strong, durable fused metallic coating on its surface.

In another embodiment of the present invention, after the object is first sprayed with the self-fluxing coating, a second coating is applied on top of it. This second coating is of a high-melting material, for example, a ceramic material, such as aluminum oxide (alumina). The ceramic coating typically has a melting point of from about 4000° F. to about 6000° F. The second coating has the effect of acting as a mold during the fusing operation, containing the molten self-fluxing alloy adjacent to the article's surface. When this embodiment is used, both the ceramic and the glass outer coatings are removed from the article at the end of the process, exposing the finished fused metallic coating on the article.

In still another embodiment, the low-melting glass frit which is used is selected to have a melting point which is slightly higher than the melting temperature of the self-fluxing alloy (e.g., the difference is from about 50 to about 100° F.). Using this embodiment, one can visually assess whether the self-fluxing alloy has become molten, because when the glass is molten, it can be assumed that the self-fluxing alloy has also melted.

EXAMPLE 1

In one embodiment of the invention, a sphere, such as a ball valve, is first coated by spraying an approximately 0.040" layer of AMS 4775A onto the surface. A thin (0.004") ceramic coating, such as an alumina coating, is sprayed on top of the AMS 4775A. The object is then placed in a stainless steel or ceramic container, and glass powder or frit is placed in the container, completely encasing the coated ball. The depth of the glass frit is at least one inch higher than the top of the ball.

The container is then placed in an air furnace and is slowly heated to about 1200–1400° F. and held for several hours (typically two to four hours). This melts the glass, providing a protective environment.

The aggregate is then heated to a temperature just below the solidus temperature of the self-fluxing alloy and held for several hours to equalize the temperature throughout the bath. Typically, the temperature is about 1675° F.

After the temperature is equalized, the aggregate is heated to a temperature which is midway between the solidus and the liquidus of the self-fluxing alloy. In this embodiment, the self-fluxing alloy will not become totally liquid, so that the coating retains some rigidity. Typically this temperature will be about 1810° F. The part is held at this temperature long enough to ensure that the self-fluxing coating reaches the furnace temperature.

After completion of the 1810° F. fuse step, the part is slowly cooled to ambient temperature. In actual experience, the part is cooled at about 200° F. hour from 1810° F. to 1000° F., and then furnace cooled to ambient temperature. The glass is then broken away and the fused ball is then finish-ground to the appropriate dimensions.

EXAMPLE 2

In a second embodiment of the present invention, the coating is a self-fluxing alloy containing a percentage of a refractory carbide material such as a tungsten carbide. In one instance, we have used a commercial alloy called JK-6153, which nominally contains fifty percent by weight of a self-fluxing alloy such as AMS 4775A, and fifty percent of a tungsten carbide powder. It is to be understood that this embodiment also applies to other refractory carbides, including titanium carbide, chromium carbide, tantalum carbide, and various mixtures of these and other carbides.

EXAMPLE 3

In yet another embodiment of the present invention, the coating is an AMS 4775A material which is applied by a technique other than spraying, e.g., by adhering a thin layer of alloy-containing tape to the surface. Such braze tapes (as they are called) are commercially available.

In yet another embodiment of the invention, the object to be coated is not a ball, but a tailhook such as is used by the Navy to arrest the flight of jet aircraft. In this instance, the curved surface of the tailhook suffers wear from the abrasion of the cable, and a coating is applied to the curved surface over which the arresting cable runs. In this instance, a self-fluxing alloy is applied to the curved surface, the part is encased in glass frit, and the part is fused as in the previous examples.

What is claimed is:

1. A method for fusing a coating to a metal surface, comprising the steps of:
   (a) applying the coating to said surface;
   (b) submerging the coated surface into low-melting inert material comprising glass frit;
   (c) heating the low-melting inert material to a temperature at or above its fusing temperature so as to form an outer layer of the material on said surface;
   (d) heating the coated surface to just below the solidus temperature of the coating;
   (e) heating the coated surface to a temperature between the solidus and the liquidus temperatures of the coating;
   (f) cooling the coated surface to ambient temperature; and
   removing the outer layer of low melting inert material from the fused coated surface.

2. The method according to claim 1 wherein the coating in step (a) is a self-fluxing alloy coating.

3. The method according to claim 2 wherein the melting point of the self-fluxing ahoy coating is from about 1600 to about 2100°F.

4. The method according to claim 3 wherein the surface to be coated is a ferritic material.

5. The method according to claim 4 wherein the glass fit has a melting point of from about 900 to about 1500° F.

6. The method according to claim 5 wherein the surface submerged in the glass frit is heated to a temperature of from about 1000 to about 1400° F., for a period of from about 2 to about 4 hours.

7. The method according to claim 6 wherein the self-fluxing alloy coating is applied by thermal spray.

8. The method according to claim 6 wherein after applying the self-fluxing coating in step (a) and before submerging the coated surface into glass fit in step (b), the article receives a coating of a high-melting ceramic material.

9. The method according to claim 8 wherein the ceramic coating comprises aluminum oxide.

10. The method according to claim 8 wherein, in step (g), the ceramic coating is removed from the article along with the glass coating.

11. The method according to claim 6 wherein the melting point of the glass is slightly higher than the melting point of the self-fluxing alloy.

12. The method according to claim 4 wherein the surface being coated is on a non-cylindrical metal object.

13. The method according to claim 2 wherein, in step (d) the coated surface is heated to a temperature about 10° F. to about 40° F. below the solidus temperature of the coating.

* * * * *

UNITED STATES PATENT AND TRADEMARK OFFICE
CERTIFICATE OF CORRECTION

PATENT NO.    : 6,648,207 B2
DATED         : January 22, 2002
INVENTOR(S)   : Buchanan E.R.

It is certified that error appears in the above-identified patent and that said Letters Patent is hereby corrected as shown below:

<u>Column 6,</u>
Line 20, is amended as follows:
"The method according….the glass frit…"
Line 30, is amended as follows:
"…surface into glass frit in step…"

Signed and Sealed this

Third Day of February, 2004

JON W. DUDAS
*Acting Director of the United States Patent and Trademark Office*